Dec. 13, 1938.　　　　D. M. WRIGHT　　　　2,140,180
CLASSIFIER
Filed March 15, 1937　　　2 Sheets-Sheet 1

David M. Wright
INVENTOR

ATTEST:
Norbut E Birch
Wm C. Meiser

BY
ATTORNEY

Dec. 13, 1938.　　　D. M. WRIGHT　　　2,140,180
CLASSIFIER
Filed March 15, 1937　　　2 Sheets—Sheet 2
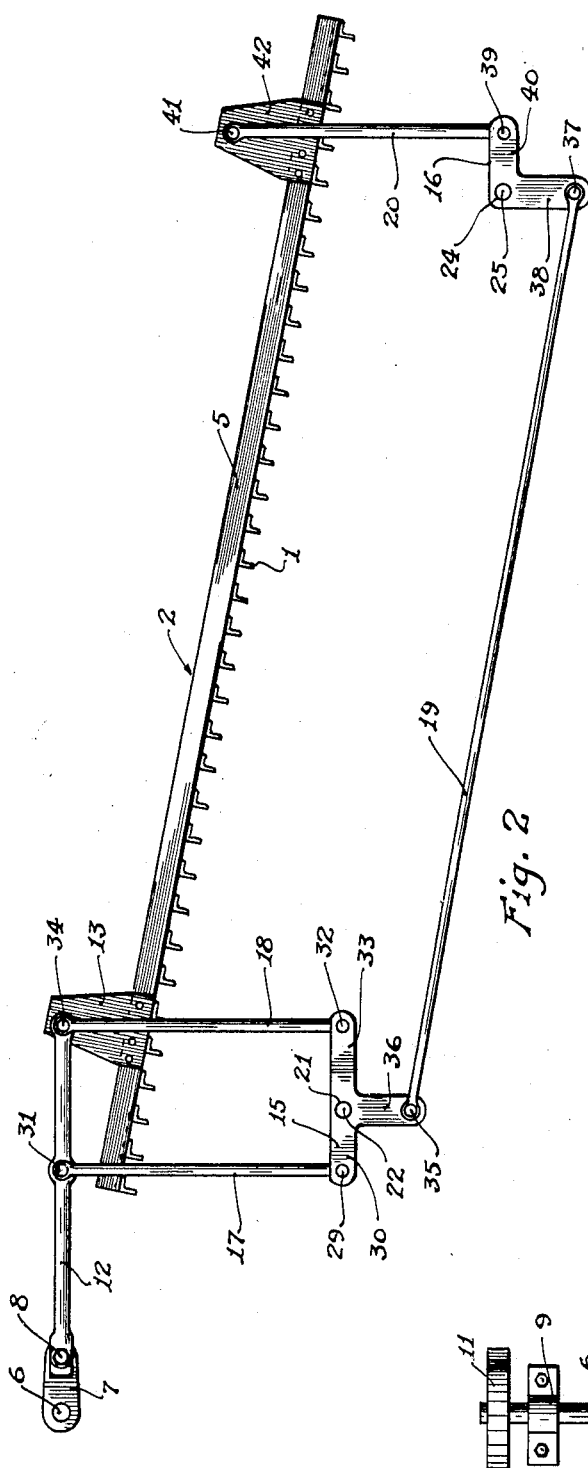
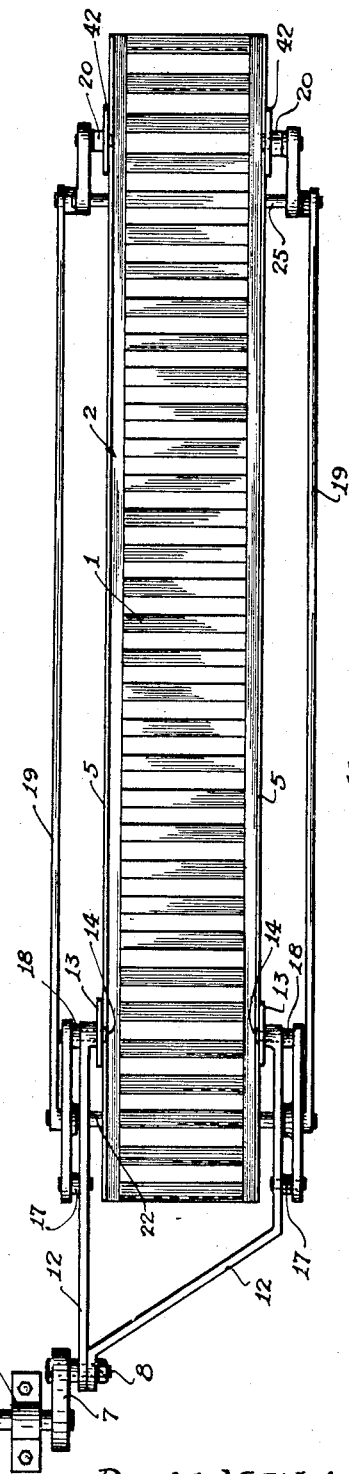
David M. Wright
INVENTOR Patented Dec. 13, 1938

2,140,180

UNITED STATES PATENT OFFICE 2,140,180

CLASSIFIER

David M. Wright, Agricola, Fla., assignor, by mesne assignments, to Swift and Company, Chicago, Ill., a corporation of Illinois Application March 15, 1937, Serial No. 131,029

3 Claims. (Cl. 209—462)

This invention relates to ore conveyors and classifiers.

One of the objects of the invention is to provide a classifying rake having a relatively long flat operating zone.

Another object of the invention is to provide an improved link arrangement for operating a classifying rake.

Other objects of the invention will be apparent from the description and claims which follow.

Reference is had to the drawings in which similar characters of reference are used to designate like elements.

Figure 2 is a side view of the rake and linkage mechanism.

Figure 3 is a top plan view of Figure 2.

Figure 1:
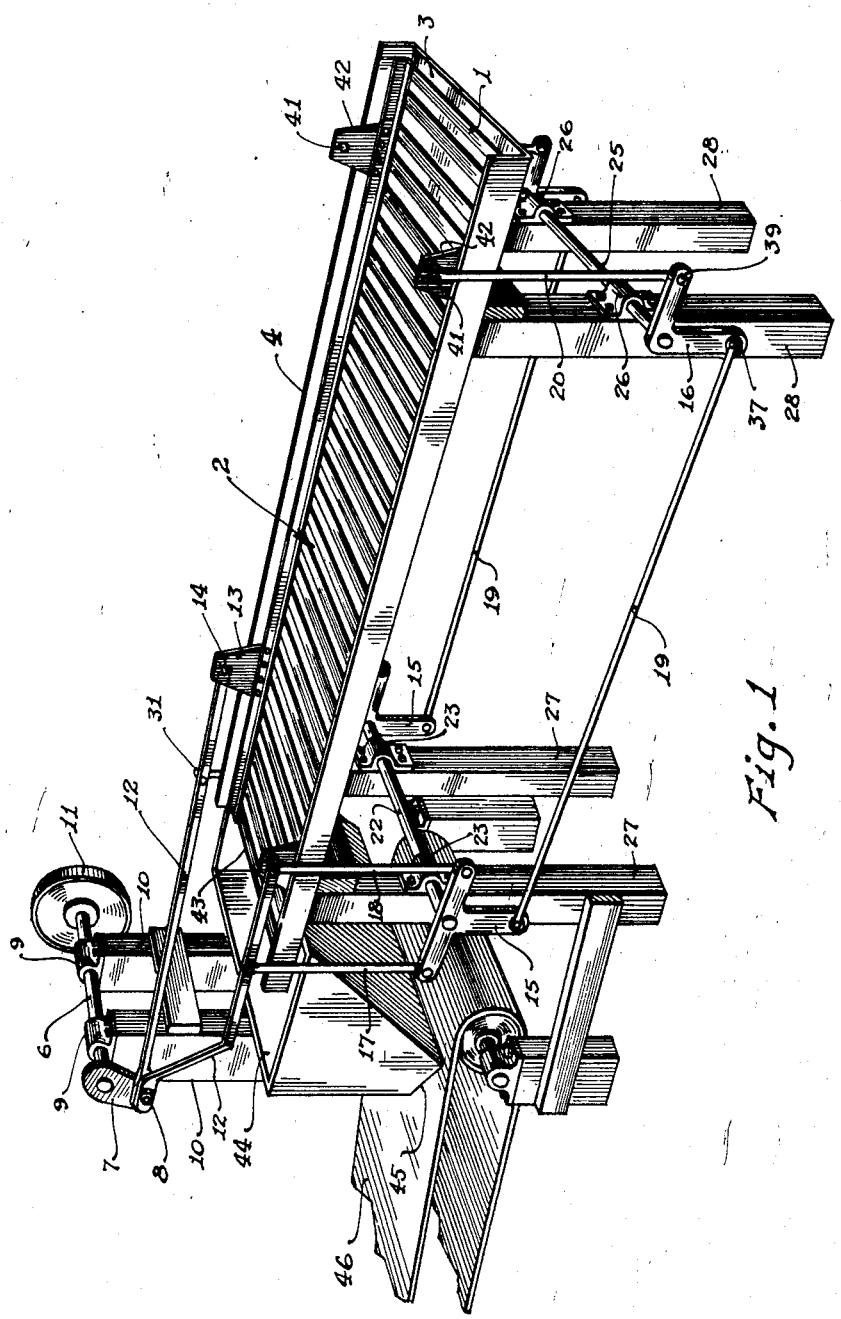
Figure 1 is a perspective view of a classifying rake constructed in accordance with the present invention.

The cross pieces 1 of rake 2 operate on inclined bed 3 of trough 4. Cross pieces 1 may comprise individual angle irons rigidly affixed to frame 5 of rake 2.

The mechanism for dragging the rake upwardly on the bed, lifting it and returning it to repeat the cycle is operated by shaft 6 through crank 7 and crank pin 8. Shaft 6 is journaled in suitable bearings 9 bolted or otherwise secured to risers 10 and is rotatably driven by drive wheel or gear 11 connected with a source of power not shown.

Lateral motion of rake 2 is accomplished through pitmen or links 12 pivoted as at one of their ends to crank pin 8 and at the other of their ends to plates 13 as by pins 14. Plates 13 are bolted or otherwise rigidly secured to opposite frame members 5 of rake 2.

At the extreme of its forward discharge movement, rake 2 is raised relative to bed 3 and thus returned to the extreme of its rearward movement, whence it is lowered relative to bed 3 to repeat the cycle. The raising and lowering of rake 2 relative to bed 3 is accomplished through crank levers 15 and 16 operatively connected with one another and with rake 2 and links 12 as by links 17, 18, 19 and 20.

Crank levers 15 are fulcrumed as at 21 to shaft 22, mounted in keepers 23. Crank levers 16 are fulcrumed as at 24 to shaft 25 mounted in keepers 26. Keepers 23 and 26 are respectively secured to risers 27 and 28 which serve to rigidly support trough 4.

Links 17 are pivoted as at 29 to arms 30 of levers 15 and as at 31 to links 12, the pivotal points 31 being intermediate plates 13 and crank pins 8. Links 18 are pivoted as at 32 to arms 33 of levers 15 and as at 34 to plates 13. Pivots 34 may be provided by extensions of the pins 14.

Links 19 are pivoted as at 35 to arms 36 of levers 15 and as at 37 to arms 38 of levers 16, and thus serve to operatively connect levers 15 with levers 16.

Links 20 are pivoted as at 39 to arms 40 of levers 16 and as at 41 to plates 42. Plates 42 are bolted or otherwise secured to framework 5 of rake 2.

When crank 7 is in the position shown in Figure 2, it is seen that through links 12, rake 2 is at the extreme of its rearwardmost lateral movement. By rotating crank 7 in a counterclockwise direction, as viewed in Figure 2, it is seen that rake 2 is laterally moved forwardly and that links 12 are inclined upwardly from pivots 34 and thus through links 17 serve to raise arms 30 of levers 15. When arms 30 of levers 15 are raised, arms 33 are lowered and thus through link 18 rake 2 is lowered relative to bed 3. It is further seen that through links 19 arms 33 and 36 of levers 15 and arms 40 and 38 of levers 16 are respectively maintained in relative movements and that through links 20 levers 16 serve to raise and lower the opposite end of rake 2 in a relative movement with links 18.

It is also seen that by continuing rotation of crank 7, rake 2 will be laterally moved in a rearwardly direction and that links 12 will be inclined downwardly from pivots 34 and thus through the several links 17, 18, 19 and 20 and levers 15 and 16 rake 2 will be raised relative to bed 3.

The solids material separated by rake 2 is intermittently dragged upwardly along bed 3 in a step-by-step movement and on reaching end 43 of bed 3 is discharged into hopper 44 whence it is passed through opening 45 on to endless conveyor 46 or other conveying means for transfer to a remote point.

The present invention provides a most simple arrangement for imparting reversible lateral movements to the rake 2 and for raising and lowering the rake at the extremes of its opposite movements.

I claim:

1. In a rake classifier including a trough and a rake movably mounted in said trough, means for reciprocating and for raising and lowering the rake relative to said trough comprising a bell crank pivotally mounted at one end of the trough, a T-crank pivotally mounted at its intersection at the opposite end of the trough, a link connecting corresponding arms of the bell crank and the T-crank, links separately connecting the remaining corresponding arms of the bell crank and the T-crank with the rake, a crank shaft, a pitman connecting the crank shaft with the rake at the point of connection of the link connecting the T-crank with the rake and a link parallel to the last-mentioned link connecting the remaining arm of the T-crank with the pitman.

2. In a rake classifier including a trough, a rake movably mounted in the trough and means for reciprocating the rake relative to the trough comprising a crank shaft and a pitman connecting the crank shaft with the rake, means for raising and lowering the rake relative to the trough and in synchronism with the reciprocating movement of the rake comprising a bell crank pivotally mounted at one end of the trough, a T-crank pivotally mounted at its intersection at the opposite end of the trough, a link operatively connecting corresponding arms of the bell crank and the T-crank, a link connecting each of the other corresponding arms of the bell crank and the T-crank with the rake, the link connecting the T-crank with the rake connecting the rake at the point of connection of the pitman with the rake and a link parallel with the last-mentioned link connecting the remaining arm of the T-crank with the pitman.

3. In a rake classifier including a trough and a rake movably mounted in said trough, means for reciprocating and for raising and lowering the rake relative to said trough comprising a bell crank pivotally mounted at one end of the trough, a T-crank pivotally mounted at its intersection at the other end of the trough, the vertical arm of the T-crank being linked to the vertical arm of the bell crank, a link connecting the other arm of the bell crank with the rake, a parallel link connecting the corresponding arm of the T-crank with the rake, a crank shaft, a pitman connecting the crank shaft with the rake at the point of connection of the last-mentioned link with the rake and a link parallel to the last-mentioned link connecting the remaining arm of the T-crank with the pitman.

DAVID M. WRIGHT.